United States Patent Office 2,839,492
Patented June 17, 1958

2,839,492

HEAT STABLE AROMATIC LINEAR POLYESTERS

John R. Caldwell and Russell Gilkey, Kingsport, Tenn., assignors to Eastman Kodak Company, Rochester, N. Y., a corporation of New Jersey No Drawing. Application August 23, 1954
Serial No. 451,692

17 Claims. (Cl. 260—45.35)

This invention relates primarily to high melting linear polyesters prepared by condensing an aromatic dibasic acid diester with a polymethylene glycol and possibly a minor amount of an aliphatic ether glycol or a branched chain alkylene glycol employing from about 0.05 to about 1.0 mole percent of a diester of maleic or fumaric acid as a heat stabilizer. The essentially linear polyesters produced are especially suitable for injection molding or extrusion processes where the polyester is maintained in a softened or melted condition for a significant period of time, e. g. the extrusion of film or melt spinning of fibers.

It is an object of this invention to provide essentially linear polyesters as described herein having improved heat stability. It is another object to provide a process as described herein for preparing valuable heat-stable linear polyesters. Other objects will become apparent hereinafter.

Linear highly polymeric esters of terephthalic acid or other dibasic aromatic acids and various glycols, for example, ethylene glycol, trimethylene glycol, hexamethylene glycol, etc., are well known, and have been used in the preparation of useful sheets, films, filaments, fibers and the like, which have high melting points and a low degree of solubility in organic solvents. Interpolyesters of terephthalic acid and other dibasic acids condensed with various dihydroxy compounds have also been described. The polyesters known in the prior art can be readily prepared according to previously described processes. However, they do not possess the herein-described highly advantageous property of unusual heat stability which renders them especially suitable for processing by injection molding and extrusion methods.

The preparation of high melting linear polyesters according to the prior art generally involves the reaction of a dibasic aromatic dicarboxylic acid with a dihydric alcohol (a glycol). It is advantageous to employ esters of the dicarboxylic acid whereby ester interchange takes place with the glycol in the presence of a catalyst to form a polyester and a monohydric alcohol. When using the ester interchange method, the time required to form the polyesters is generally considerably less than when the free dicarboxylic acid is employed. The long chain in the polyester is built up by a series of ester interchange reactions wherein the glycol displaces a relatively low-boiling alcohol component of the acid ester to form a glycol ester. During the last stages of the reaction, it is generally desirable to heat the condensing reaction mixture to a temperature of about 225°–275° C. or higher in order to maintain the fluid state. For this reason, the stability of the melt at a high temperature is very important. If considerable care is not employed, degradation may occur to an extent sufficient to materially reduce the inherent viscosity of the melt, degrade the color of the product, etc., whereby the polyester product will have properties which are generally inferior to those otherwise obtainable.

The polyesters produced by the processes known to the art can be used to form fibers, film, etc. by various extrusion and injection molding techniques. In using these techniques it is necessary to maintain the polyester at an elevated temperature for such a length of time that substantial degradation due to heat can and does frequently occur.

In Example 1 hereinbelow the advantage of this invention is illustrated. Essentially identical polyesters as described in the example had the following inherent viscosities after the specified periods of time at 275°–280° C.

| Time (Minutes) | Inherent Viscosity of Polyester | |
|---|---|---|
| | Unstabilized | Stabilized |
| 40 | 0.80 | 0.80 |
| 60 | 0.35 | 0.82 |
| 90 | | 0.86 |
| 120 | | 0.62 |
| 180 | | 0.34 |

It is apparent that a significant improvement in thermal stability of the polyester is obtained using a maleate or fumarate as a heat stabilizer according to this invention. When more than the maximum of one mole percent of the stabilizer is employed the product no longer has the essentially linear character of the polyesters of this invention.

The maleic or fumaric acids are preferably used in the form of their lower alkyl esters although hydroxyalkyl and alkyl esters containing up to 10 or more carbon atoms can be employed. Moreover, the free acids or maleic anhydride can be used by first heating with an excess of a glycol or other alcohol to esterify the acid.

These maleates or fumarates are trifunctional compounds which would ordinarily be principally considered as cross-linking agents and would be employed in quantities above the 1.0 mole percent maximum specified for this invention. Moreover, cross-linking is frequently initiated by the use of a peroxy catalyst which is absent from the process of this invention.

The maleate or fumarate used according to this invention is introduced during the initial stages of the condensation rather than during the latter stages as is frequently the case when substantial cross-linking is desired. Thus, the maleate or fumarate enters into the main molecular chain. The structure of this chain substantially retains its linear polymeric character. However, it appears that some inter-molecular bonds are created during the latter stages of the condensation reaction due to the presence of the olefinic bonds in the molecular chain. The essentially linear polyesters produced are the result of accurately controlled formation of inter-molecular links which exist to a very restricted extent. The polyesters produced are completely soluble in practically all solvents which would dissolve the unstabilized polyesters. It is unexpected to obtain a high molecular weight polyester of this nature since cross-linking would be expected to form an insoluble fraction of the polymer.

The essentially linear polyesters of this invention have high melt stability which is especially important when the polymers are used in melt spinning or extrusion equipment at temperatures in the range of 200°–280° C.

In accordance with a principal embodiment of our invention we have provided a new process for preparing heat stable essentially linear polyesters which soften or melt at about 150° C. or higher comprising condensing in the presence of from about 0.0005 up to about 0.01 mole proportion (based on the proportion of aromatic dicarboxylic acid diester employed in preparing the polyester) of a heat stabilizer selected from the group consisting of those having the following formulas:

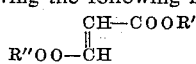

and

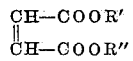

wherein R' and R" each represents a radical selected from the group consisting of alkyl and hydroxyalkyl radicals containing from 1 to 10 carbon atoms which are arranged in branched as well as straight chains, (A) an aromatic dicarboxylic acid diester having the formula:

$$R_1OOC-R_2-X-R_3-COOR_4$$

wherein $R_1$ and $R_4$ each represents a member selected from the group consisting of an alkyl radical containing from 1 to 10 carbon atoms and an omega-hydroxyalkyl radical containing from 2 to 12 carbon atoms, $R_2$ and $R_3$ each represents $(CH_2)_{n-1}$ wherein $n$ is a positive integer of from 1 to 5 inclusive and X represents a divalent aromatic radical selected from the group having the following formulas:

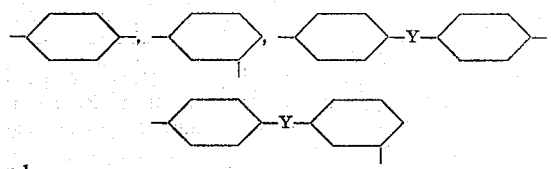

and

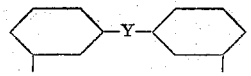

wherein Y represents a divalent radical selected from the group consisting of

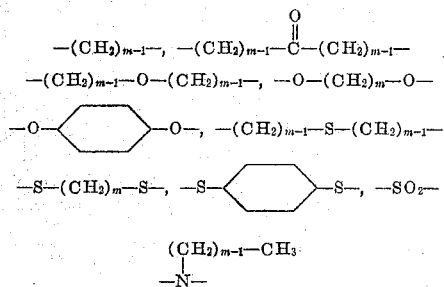

and

wherein $m$ is a positive integer of from 1 to 5 inclusive, with (B) a dioxy compound selected from the group consisting of those compounds having the following formulas:

$$R_5-O-C_pH_{2p}-O-R_6$$

and $$R_5O-(-R_7-O)_q-R_7-OR_6$$

wherein $p$ represents a positive integer of from 2 to 12 inclusive, $R_5$ and $R_6$ each represents a substituent selected from the group consisting of a hydrogen atom and an acyl radical containing from 2 to 4 carbon atoms, $R_7$ represents an alkylene radical containing from 2 to 4 carbon atoms and $q$ represents a positive integer of from 1 to 10 inclusive, the dioxy compound being employed in such a proportion that there is at least an equivalent amount of oxy substituents in proportion to the carboxy substituents in the overall combination of the aromatic diesters and the dioxy compounds, (C) and in the further presence of a catalytic condensing agent, (D) at an elevated temperature which is increased gradually during the course of the condensation up to a temperature of from about 225° to about 310° C., (E) the condensation being conducted in an inert atmosphere, (F) and conducting the condensation at a very low pressure of the inert atmosphere during the latter part of the condensation.

Advantageously, the condensing agent is employed in an amount of from about 0.005% to about 0.2% based on the weight of the aromatic dicarboxylic acid diester. Higher and lower proportions can also be employed.

Advantageously, the dioxy compound is employed in such a proportion that there are from about 1.2 to about 3 oxyoxy substituents in proportion to the carbalkoxy substituents in the overall combination of the aromatic diesters and the dioxy compounds. Higher (e. g. 10) and lower (e. g. 1) proportions can also be employed.

Advantageously, the temperature employed during the earlier part of the condensation is from about 150° to about 220° C. Higher and lower temperatures can also be employed.

Advantageously, the low pressure defined under (F) is less than about 15 mm. of Hg pressure (preferably less than 5 mm.).

Most advantageously, the aromatic dicarboxylic acid diester is a diester of p,p'-sulfonyl dibenzoic acid or terephthalic acid and the polyoxy compound is a polymethylene glycol.

This invention also includes processes as described above whereby polyesters can be prepared by replacing a part of the described aromatic dibasic acid diester with an ester of a replacement acid which can be an aliphatic dibasic acid, e. g. carbonic acid, oxalic acid, succinic acid, adipic acid, sebacic acid, α,α-dimethylglutaric acid, dimethylmalonic acid, diglycolic acid, β-oxydipropionic acid, γ-oxydibutyric acid, etc. The process described above for the general practice of this invention need not be appreciably modified when such partial replacement acid esters are employed in conjunction with the aromatic dibasic acid esters. The various polyesters containing replacement acid esters as described in this paragraph can be prepared according to procedures similar to those described in copending applications filed on October 3, 1952, by J. R. Caldwell, Serial Nos. 313,062–313,067, inclusive.

It is well known in the linear polyester art that the condensation of dibasic acid diesters and dihydroxy compounds is carried out in an excess of the dihydroxy compound at the beginning. If the ester interchange produces a monohydric alcohol it is evaporated away and not included as available oxy radicals insofar as the condensation is concerned. If the ester interchange theoretically would produce a dihydroxy compound then that compound fully participates in the condensation. The amount of dihydroxy compound employed is calculated with these principles in mind.

The dioxy compounds defined above may not actually contain any free hydroxy radicals since they may be in esterified form as indicated by the formulas of the dioxy compounds set forth above. These hydroxy or substituted hydroxy radicals are referred to generically as oxy radicals or substituents. Each diester is considered as containing two carboxy radicals as that term is employed in the definition of the process as described. When $R_1$ and $R_4$ represent omega-hydroxyalkyl radicals then these particular diesters contribute to the total amount of oxy radicals available to participate in the condensation reaction.

Furthermore, this invention covers processes as defined above wherein the aromatic dicarboxylic acid diester is formed by a preliminary step comprising condensing an aromatic dicarboxylic acid having the formula:

$$HOOC-R_2-X-R_3-COOH$$

(wherein $R_2$, $R_3$ and X are defined under (A) in the above-described process), with a dioxy compound which is defined above under (B) and is employed in the proportions set forth under (B), at an elevated temperature, after which preliminary step the catalytic condensing agent as referred to under (C) is added and the condensation is completed as defined under (D), (E) and (F). Advantageously, the elevated temperature employed during the preliminary step is substantially that at which reflux conditions subsist; however, higher and lower temperatures can also be used. Advantageously, as indicated hereinbefore, the dioxy compound is employed in such a proportion that there are from about 1.2 to about 3 oxy substituents in proportion to the carboxy substituents in the overall combination of the aromatic diester and the dioxy compounds.

In preparing polyesters, especially linear highly polymeric polyesters, it is important to exclude oxygen and moisture at all stages of the condensation, particularly during the latter stages thereof. An inert atmosphere is employed to exclude oxygen; such atmospheres include hydrogen, nitrogen, helium, etc. The reacting materials employed in the condensation are advantageously substantially anhydrous; however, if water is initially present or is formed during the course of the condensation, it can be substantially completely removed prior to the final stages of the condensation by operating in accordance with the specified process or otherwise.

As indicated above, the acidic constituents of the interpolyesters are employed in the form of their diesters. The omega-hydroxyalkyl diesters can be prepared as described above by heating a polymethylene glycol (or an aliphatic ether glycol) with the free acid, preferably employing an excess of the glycol. The beta-hydroxyalkyl diesters can be prepared as described in my parent application employing an alkylene oxide. The acid chlorides can be employed in some cases although the conditions involved are generally substantially different.

Examples of aromatic dicarboxylic acid diesters which can be employed as defined above under (A) include the β-hydroxyethyl diester of p,p'-sulfonyl dibenzoic acid, p,p'-sulfonyl dibenzoic acid dibutyl ester, m,p'-sulfonyl dibenzoic acid dipropyl ester, m,m'-sulfonyl dibenzoic acid dihexyl ester, methyl terephthalate, hexyl terephthalate, isopropyl terephthalate, etc.

Examples of other suitable aromatic dibasic acids whose various esters can be employed include phthalic acid (ortho isomer), isophthalic acid (meta isomer), 5-chloroisophthalic acid, 4 - phenylphthalic acid, 3' - isopropyl - 2,3 - dicarboxybiphenyl (cf. Lux, Monatsh. f. Chemie 29, 772,774, who also describes the dimethyl ester), and various other analogous compounds such as 3,4-dicarboxybiphenyl which can be prepared by oxidizing 3 - carboxy - 4 - methylbiphenyl (also called 2-methyl-4-phenyl benzoic acid) in a hot alkaline solution (presence of NaOH) employing potassium permanganate as the oxidizing agent (see Zincke et al., Berichte Deutsch. Chem. Gesellsch., 55, 2184); other related dicarboxybiphenyl derivatives can be similarly prepared by oxidizing the corresponding monomethyl carboxybiphenyl.

Examples of still other diesters of aromatic dibasic acids are illustrated by the following formulas:

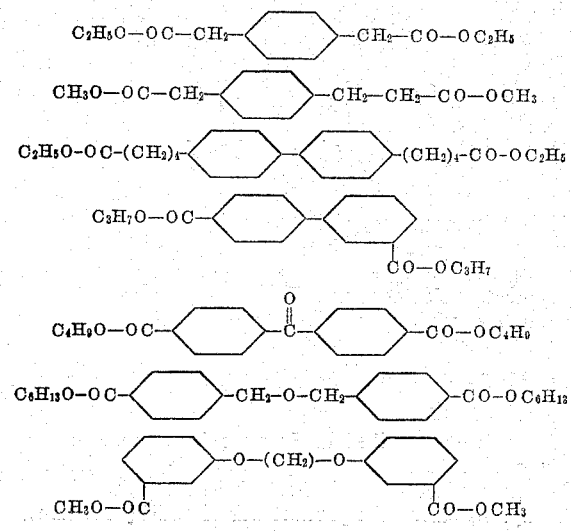

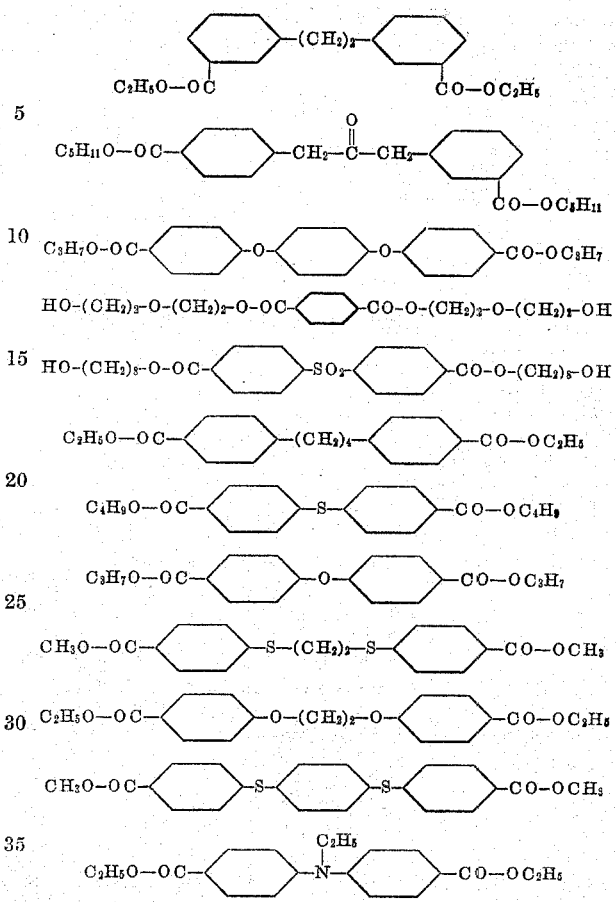

et cetera.

The dioxy compounds which can be employed to form highly polymeric linear polyesters are straight-chain alkane diols, viz. polymethylene glycols, wherein the hydroxy radicals are positioned at the two ends of the alkylene chain. Examples of such glycols include ethylene glycol, 1,3-propylene glycol, 1,4-butylene glycol, 1,6-hexylene glycol, 1,10 - decamethylene glycol, 1,12 - dodecamethylene glycol, etc. As indicated above, mono or diesters of these glycols can also be employed. Thus, the acetates, propionates and butyrates are examples of such esters. The defined ether glycols can be employed either in lieu of the polymethylene glycols or in conjunction therewith as modifiers. Examples of ether glycols include diethylene glycol, triethylene glycol, tetraethylene glycol, bis (4-hydroxybutyl) ether, bis (3-hydroxypropyl) ether, etc. Moreover, branched chain glycols can also be employed as modifiers, e. g. 2-methylpropanediol, 3-ethyl-hexane-diol, etc.

Valuable fibers can be advantageously prepared employing the higher melting polyesters which can be produced according to the procedures described herein. Preferably no aliphatic ether glycol or branched chain glycol is employed when fibers are to be prepared. Furthermore, the aromatic acid diesters should ordinarily contain only p,p' linkages when highly polymeric linear polyesters are desired. However, on the other hand, valuable polyesters can be prepared employing aliphatic ether glycols or branched chain alkylene glycols without any polymethylene glycol although the product obtained will not be suitable for forming useful fibers. The same applied to the employment of aromatic diesters containing linkages in other than the para positions.

The catalytic condensing agents which can be advantageously employed include the alkali metals, the alkaline earth metals, the oxides of these two groups of metals, the alkoxides containing from 1 to 6 carbon atoms of these two groups of metals, the carbonates and borates of these two groups of metals, lead oxide, and compounds having the following formulas:

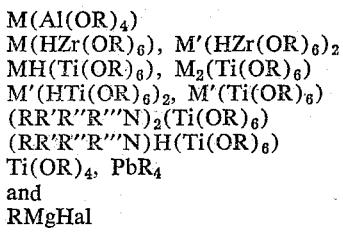

M(Al(OR)$_4$)
M(HZr(OR)$_6$), M'(HZr(OR)$_6$)$_2$
MH(Ti(OR)$_6$), M$_2$(Ti(OR)$_6$)
M'(HTi(OR)$_6$)$_2$, M'(Ti(OR)$_6$)
(RR'R''R''')N)$_2$(Ti(OR)$_6$)
(RR'R''R''')N)H(Ti(OR)$_6$)
Ti(OR)$_4$, PbR$_4$
and
RMgHal wherein M represents an alkali metal, M' represents an alkaline earth metal selected from the group consisting of magnesium, calcium and strontium, R represents an alkyl group containing from 1 to 6 carbon atoms, R', R" and R''' each represents a member of the group consisting of R and an aryl group of the benzene series containing from 6 to 9 carbon atoms and Hal represents a halogen atom. Other catalytic condensing agents known in the art can be similarly employed.

It has been found that the type of catalyst used has an important bearing upon the properties of the final product. Although any of the catalysts disclosed in the prior art may be used, it has been found that certain catalysts give superior results. The aluminum and titanium alkoxide complexes described in copending applications filed by J. R. Caldwell on October 3, 1952, are especially valuable for the preparation of the polyesters where fiber or films having unusually superior properties are desired. Moreover, novel tin catalysts have also been found to be especially effective. See Caldwell Serial No. 313,072, Patent No. 2,720,502; Serial No. 313,078, Patent No. 2,720,507; Caldwell and Reynolds Serial No. 313,077, Patent No. 2,720,506; Wellman and Caldwell Serial No. 313,074, Patent No. 2,720,504; Serial No. 313,075, Patent No. 2,727,881; Serial No. 313,076, Patent No. 2,720,505, Wellman Serial No. 313,073 for a description of especially advantageous catalytic condensing agents.

The catalytic condensing agents can be advantageously employed in amounts ranging from about 0.005% to about 0.2% based on the weight of the diesters being condensed. Higher or lower percentages can also be employed. Generally, for about 0.01% to about 0.06% of the catalytic condensing agent can be advantageously employed based on the weight of the various diesters being condensed.

The temperature at which polyesterification can be conducted is dependent upon the specific reactants involved in any given reaction. In general, the reaction mixture can be heated with agitation at from about 150° to about 220° C. for from approximately one to three hours in an inert atmosphere (e. g. nitrogen or hydrogen); the mixture can then be heated with agitation at from about 225°–240° to about 280°–310° C. in the same atmosphere for approximately 1 to 2 hours. Finally, the pressure can be greatly reduced to form a vacuum (less than about 15 mm. of Hg pressure but preferably on the order of less than 5 mm. of Hg pressure, while the temperature is maintained in the same range (225°–310° C.); these conditions are advantageously maintained for approximately 1 to 6 additional hours. This final phase is advantageously carried out with good agitation under the high vacuum in order to facilitate the escape of volatile products from the highly viscous melt. The conditions can be varied considerably depending upon the degree of polyesterification desired, the ultimate properties sought, and the use for which the product is intended. Since the process of this invention results in unusually stable molten polyesters, the heating under a high vacuum during the latter stages of the condensation can be continued for much longer periods of time than was formerly possible.

The reaction can be carried out in the presence or absence of a solvent. Inert, high boiling compounds, such as diphenyl ether, diphenyl, mixed tolyl sulfones, chlorinated naphthalene, chlorinated diphenyl, dimethyl sulfolane, etc., can be used as the reaction medium.

This invention can be further illustrated by the following examples; in addition to these examples it is apparent that other variations and modifications thereof can be adapted to obtain similar results:

*Example 1.—Sulfonyl dibenzoic ester, pentanediol and a maleate*

Four hundred and twenty grams (1.0 mole) of p,p'-sulfonyldibenzoic acid, dibutyl ester, 1.4 g. (0.01 mole) of dimethyl maleate, and 200 g. (1.8 moles) of pentamethylene glycol were placed in a reaction vessel equipped with a stirrer, a distillation column, and an inlet for purified nitrogen. A solution of 0.1 g. sodium titanium butoxide in 5 cc. of butyl alcohol was added as catalyst and the mixture was stirred at 200–210° C. in an atmosphere of purified nitrogen. Butyl alcohol distilled from the vessel as the ester interchange took place. When the evolution of butyl alcohol had practically stopped, the temperature was raised to 275–280° C. and held for 15 minutes. A vacuum of 0.1 mm. was then applied. After 30–40 minutes of stirring under vacuum, the melt had become very viscous and difficult to stir. Samples were taken at intervals and the inherent viscosity was determined in a solution of 60 phenol-40 tetrachlorethane. The following values were obtained.

| Time under vacuum: | Inherent viscosity |
|---|---|
| 40 minutes | 0.80 |
| 90 minutes | 0.86 |
| 120 minutes | 0.62 |
| 180 minutes | 0.34 |

When this same polymer is prepared without incorporating the dimethyl maleate, the viscosity drops to 0.35 after 60 minutes. It is thus apparent that a significant improvement in thermal stability of the polymer is obtained by incorporating the maleic acid.

This polyester is especially valuable for the production of the fibers by the melt-spinning process. It shows substantially no degradation during the operations of melting, filtering and extruding. It is also useful as a photographic film base.

*Example 2.—Sulfonyl dibenzoic ester, sebacic ester, pentanediol and a maleate*

Three hundred and thirty grams (1.0 mole) of p,p'-sulfonyldibenzoic acid dimethyl ester, 77 g. (0.33 mole) of dimethyl sebacate, 0.96 g. (0.0067 mole) of dimethyl maleate, and 210 g. (2.0 moles) of pentamethylene glycol were placed in a reaction vessel as described in Example 1. A solution of 0.05 g. titanium ethoxide in 5 cc. of ethyl alcohol was added as catalyst, and the mixture was stirred at 200–210° C. for 1 hour. During this time, methyl alcohol distilled from the vessel. The temperature was then raised to 260° C. and held for 30 minutes. A vacuum of 0.1 mm. was applied and stirring was continued for 1½ hours. The product had a melt-viscosity so high that it could be stirred only with difficulty. The inherent viscosity, as measured in a solution of 60 phenol-40 tetrachlorethane, was 1.26.

This polyester is especially valuable as a molding plastic. Because of its very high melt-viscosity, it can be processed readily in standard extrusion and injection molding equipment. Furthermore, it shows substantially no degradation when maintained in the melted state for several hours.

*Example 3.—Sulfonyl dibenzoic ester, sebacic ester and a fumarate*

The process described in Example 2 was repeated exactly except that 0.96 g. (0.0067 mole) of dimethyl fumarate was employed in lieu of the same quantity of dimethyl maleate. The product was essentially the same.

The polyester had a very high melt viscosity. It can be used as a molding plastic as described in Example 2.

*Example 4.—Sulfonyl dibenzoic ester, hexanediol and a maleate*

Four hundred and twenty grams (1.0 mole) of p,p'-sulfonyldibenzoic acid dibutyl ester, 1.12 g. (0.008 mole) of dimethyl maleate, and 240 g. (2.0 moles) of hexamethylene glycol were placed in a reaction vessel and processed as described in Example 1. The product had a very high melt viscosity. The inherent viscosity, as measured in a solution of 60 phenol-40 tetrachlorethane, was 0.82. This polyester is especially valuable for the manufacture of fibers and films. It shows substantially no degradation during the melt spinning process.

*Example 5.—Terephthalic ester, ethylene glycol and a maleate*

One hundred and ninety-four grams (1.0 mole) of dimethyl terephthalate, 1.12 g. (0.008 mole) of dimethyl maleate, and 186 g. (3.0 moles) of ethylene glycol were placed in a reaction vessel as described in Example 1. A solution of 0.1 g. lithium aluminum methoxide in 5 cc. methanol was added as catalyst. The mixture was stirred in an atmosphere of purified hydrogen at 190° C. for 6 hours in order to remove most of the methanol formed by ester interchange. The temperature was then raised to 275–280° C. and held for one hour. A vacuum of 0.2 mm. was applied and stirring was continued for 2 hours. A polyester having a very high melt-viscosity was obtained. The inherent viscosity was 0.78.

This polyester is especially useful for the manufacture of fibers by the melt spinning process. It shows very little degradation when held in the melted state for 3 to 4 hours.

*Example 6.—Sulfonyl dibenzoic ester, succinic ester, Octanediol and a maleate*

The process described in Example 2 was repeated except for the use of the following reactants: 2 g. moles, p,p'-sulfonyldibenzoic acid dibutyl ester; 1 g. mole dibutyl succinate; 4 g. moles octamethylene glycol; and 0.018 g. mole of diethyl maleate. The product was similar to that described in Example 2 in most respects, e. g. it had a very high melt viscosity. However, it had a somewhat lower softening temperature range. This polyester is a useful molding plastic.

*Example 7.—1,2-di(p-carboxyphenyl)ethane ester, butanediol and a maleate*

The process described in Example 1 was repeated except that the following reactants were employed: 1 g. mole 1,2-di(p-carbethoxyphenyl)ethane; 0.28 g. (0.002 gram mole) of diethyl maleate; and 2 g. moles of tetramethylene glycol. The product was essentially analogous to that described in Example 1, especially in regard to its improved thermal stability.

*Example 8.—1,2-di(p-carboxyphenoxy)ethane ester, ethylene glycol, diethylene glycol and a fumarate*

The process described in Example 1 was repeated except that the following reactants were employed: 1 g. mole 1,2-di(p-carbmethoxyphenoxy)ethane; 0.005 g. mole of dimethyl fumarate; 1 g. mole ethylene glycol; and 1 g. mole diethylene glycol. The product was analogous to that described in Example 1 although it had a considerably lower softening temperature range. This polyester is a useful molding polymer.

*Example 9.—p,p'-diphenic ester, 2-methylpropanediol and a fumarate*

The process described in Example 1 was repeated except that the following reactants were employed: approximately 1 g. mole of diphenic ester was obtained by the preliminary step of refluxing 1 g. mole of p,p'-diphenic acid and 1.2 g. moles of ethylene glycol; this preliminary condensate was then reacted with 0.008 g. mole of diethyl fumarate; and 2 g. moles of 2-methyl-1,3-propanediol as in Example 1. The polyester obtained had structural units in the polymer chain which were derived from both ethylene glycol and 2-methylpropanediol.

We claim:

1. A process for preparing a heat stable essentially linear high-melting, aromatic acid polyester which is stable in the molten condition in the range of 200°–280° C; comprising condensing in the presence of from about 0.0005 up to about 0.01 mole proportion of a heat stabilizer selected from the group consisting of those having the following formulas:

$$\begin{array}{c} CH-COOR' \\ \| \\ R''OOC-CH \end{array}$$

and $$\begin{array}{c} CH-COOR' \\ \| \\ CH-COOR'' \end{array}$$

wherein R' and R'' each represents a radical selected from the group consisting of alkyl and hydroxyalkyl radicals containing from 1 to 10 carbon atoms which are arranged in branched as well as straight chains, (A) an aromatic dicarboxylic acid diester having the formula:

$$R_1OOC-R_2-X-R_3-COOR_4$$

wherein $R_1$ and $R_4$ each represents a member selected from the group consisting of an alkyl radical containing from 1 to 10 carbon atoms and an omega-hydroxyalkyl radical containing from 2 to 12 carbon atoms, $R_2$ and $R_3$ each represents $(CH_2)_{n-1}$ wherein $n$ is a positive integer of from 1 to 5 inclusive and X represents a divalent aromatic radical selected from the group consisting of those radicals having the following formulas:

$$-\bigcirc-, \quad -\bigcirc-\bigcirc-, \quad -\bigcirc-Y-\bigcirc-$$

$$-\bigcirc-Y-$$

and $$-\bigcirc-Y-\bigcirc-$$

wherein Y represents a divalent radical selected from the group consisting of $$-(CH_2)_{m-1}-, \quad -(CH_2)_{m-1}-\overset{O}{\underset{\|}{C}}-(CH_2)_{m-1}-$$

$$-(CH_2)_{m-1}-O-(CH_2)_{m-1}-, \quad -O-(CH_2)_m-O-$$

$$-O-\bigcirc-O-, \quad -(CH_2)_{m-1}-S-(CH_2)_{m-1}-$$

$$-S-(CH_2)_m-S-, \quad -S-\bigcirc-S-, \quad -SO_2-$$

and $$\begin{array}{c} (CH_2)_{m-1}-CH_3 \\ | \\ -N- \end{array}$$

wherein $m$ is a positive integer of from 1 to 5 inclusive, with (B) a dioxy compound selected from the group consisting of those compounds having the following formulas:

$$R_5-O-C_pH_{2p}-O-R_6$$

and $$R_5O-(-R_7-O)_q-R_7-OR_6$$

wherein $p$ represents a positive integer of from 2 to 12 inclusive, $R_5$ and $R_6$ each represents a substituent selected from the group consisting of a hydrogen atom and an acyl radical containing from 2 to 4 carbon atoms, $R_7$ represents an alkylene radical containing from 2 to 4 carbon atoms and $q$ represents a positive integer of from 1 to 10 inclusive, the dioxy compound being employed in such a proportion that there is at least an equivalent amount of oxy substituents in proportion to the carboxy substituents in the over-all combination of the aromatic diesters and the dioxy compounds, (C) and in the further presence of a catalytic condensing agent, (D) at an elevated temperature which is increased gradually during the course of the condensation up to a temperature of from about 225° to about 310° C., (E) the condensation being conducted in an inert atmosphere, (F) and conducting the condensation at a very low pressure of the inert atmosphere during the latter part of the condensation.

2. A process as defined in claim 1 wherein the condensing agent is employed in an amount of from about 0.005% to about 0.2% based on the weight of the aromatic dicarboxylic acid diester.

3. A process as defined in claim 2 wherein the polyhydroxy compound is employed in such a proportion that there are from about 1.2 to about 3 hydroxy substituents in proportion to the carbalkoxy substituents in the overall combination of the aromatic diester and the polyhydroxy compound.

4. A process as defined in claim 3 wherein the elevated temperature employed during the earlier part of the condensation is from about 150° C. to about 220° C.

5. A process as defined in claim 4 wherein the low pressure defined under (F) is less than 15 mm. of Hg pressure.

6. A process as defined in claim 5 wherein the low pressure defined under (F) is less than 5 mm. of Hg pressure.

7. A process as defined in claim 6 wherein the heat stabilizer is an alkyl ester of maleic acid, the aromatic diester is an alkyl ester of p,p'-sulfonyl dibenzoic acid, and the dioxy compound is pentamethylene glycol.

8. A process as defined in claim 6 wherein the heat stabilizer is an alkyl ester of maleic acid, the aromatic diester is an alkyl ester of p,p'-sulfonyl dibenzoic acid, and the dioxy compound is hexamethylene glycol.

9. A process as defined in claim 6 wherein the heat stabilizer is an alkyl ester of maleic acid, the aromatic diester is an alkyl ester of terephthalic acid, and the dioxy compound is ethylene glycol.

10. A process as defined in claim 6 wherein the heat stabilizer is an alkyl ester of fumaric acid, the aromatic diester is an alkyl ester of terephthalic acid, and the dioxy compound is ethylene glycol.

11. A process as defined in claim 6 wherein the heat stabilizer is an alkyl ester of fumaric acid, the aromatic diester is an alkyl ester of p,p'-sulfonyl dibenzoic acid and the dioxy compound is pentamethylene glycol.

12. Essentially linear high-melting, aromatic acid highly polymeric polyesters having a high degree of stability when in the molten condition in the range of 200°–280° C.; which contain in the polyester structural configuration repeating units of the following formula:

$$-O-OC-R_2-X-R_3-CO-O-C_pH_{2p}-$$

wherein $R_2$ and $R_3$ each represents $(CH_2)_{n-1}$ wherein $n$ is a positive integer of from 1 to 5 inclusive, X represents a divalent aromatic radical selected from the group consisting of those radicals having the following formulas:

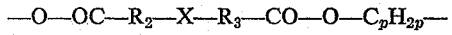

and

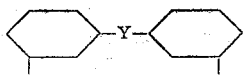

wherein Y represents a divalent radical selected from the group consisting of

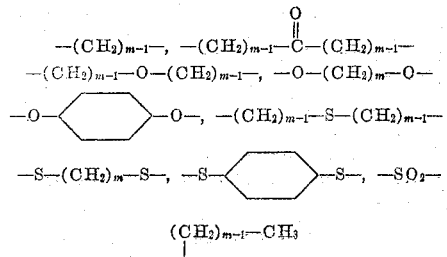

and

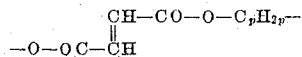

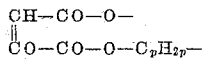

wherein $m$ is a positive integer of from 1 to 5 inclusive, and $p$ represents a positive integer of from 2 to 12 inclusive and which also contain one interspersed unit for every 100 to 2000 of the preceding repeating units which has a formula selected from the group consisting of the following formulas:

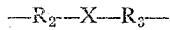

and

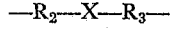

wherein $p$ is defined above and wherein the olefinic bonds have entered to a substantial extent into an interaction with a portion of an adjacent polyester molecule, whereby said polyester structural configuration consists essentially of only those repeating units which have a formula as defined above in this claim.

13. A polyester as defined in claim 12 wherein $-R_2-X-R_3-$ represents a p,p'-diphenyl sulfone radical, $p$ is 5 and the interspersed unit has the maleic formula.

14. A polyester as defined in claim 12 wherein $$-R_2-X-R_3-$$

represents a p,p'-diphenyl sulfone radical, $p$ is 6 and the interspersed unit has the maleic formula.

15. A polyester as defined in claim 12 wherein $$-R_2-X-R_3-$$

represents a p,p'-phenylene radical, $p$ is 2 and the interspersed unit has the maleic formula.

16. A polyester as defined in claim 12 wherein $$-R_2-X-R_3-$$

represents a p,p'-phenylene radical, $p$ is 2 and the interspersed unit has the fumaric formula.

17. A polyester as defined in claim 12 wherein $$-R_2-X-R_3-$$

represents a p,p'-diphenyl sulfone radical, $p$ is 5 and the interspersed unit has the fumaric formula.

References Cited in the file of this patent

UNITED STATES PATENTS

| | | |
|---|---|---|
| 2,388,319 | Fuller | Nov. 6, 1945 |
| 2,426,994 | Frosch | Sept. 9, 1947 |
| 2,445,553 | Beavers | July 20, 1948 |
| 2,593,411 | Caldwell | Apr. 22, 1952 |

OTHER REFERENCES

Briggs et al.: Chem. & Eng. News, June 25, 1943, pages 962 and 963.

UNITED STATES PATENT OFFICE
Certificate of Correction

Patent No. 2,839,492                        June 17, 1958

John R. Caldwell et al.

It is hereby certified that error appears in the printed specification of the above numbered patent requiring correction and that the said Letters Patent should read as corrected below.

Column 3, lines 3 and 4, the formula should appear as shown below instead of as in the patent:

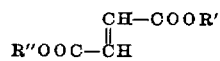

column 12, lines 29, 30, and 31, the formula should appear as shown below instead of as in the patent:

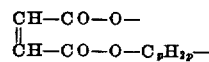

Signed and sealed this 23rd day of September 1958.

[SEAL]

Attest:
KARL H. AXLINE,
*Attesting Officer.*

ROBERT C. WATSON,
*Commissioner of Patents.*